May 5, 1942. S. COURVELLE 2,281,831
FISHING BOB
Filed June 30, 1941
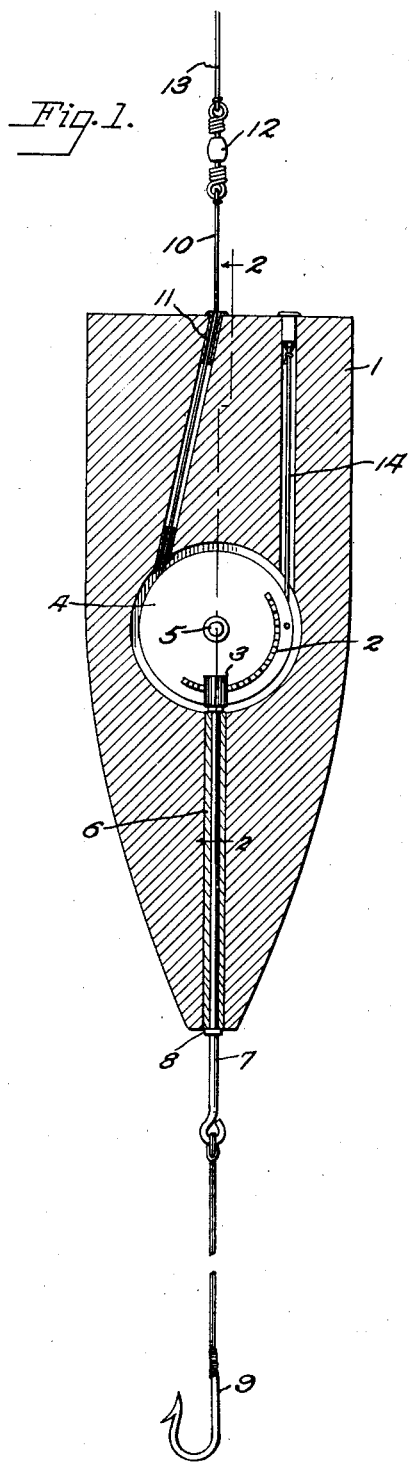
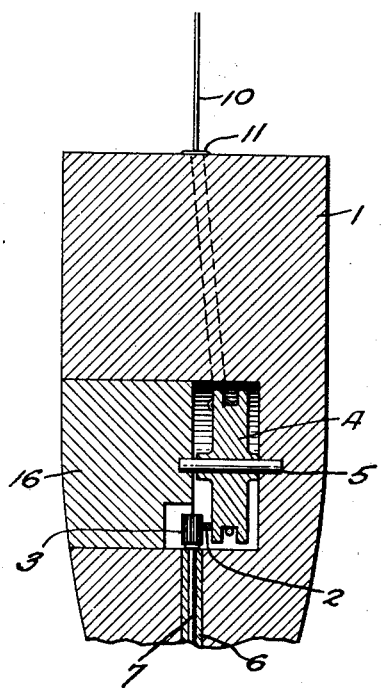
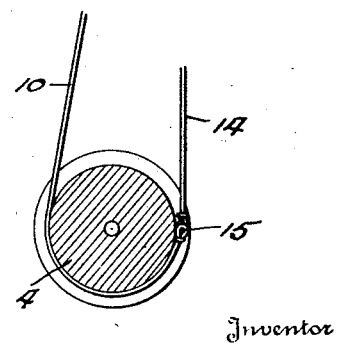
Inventor
S. Courvelle
By Mason Fenwick & Lawrence
Attorneys Patented May 5, 1942

2,281,831

UNITED STATES PATENT OFFICE 2,281,831

FISHING BOB

Sidney Courvelle, Alvin, Tex.

Application June 30, 1941, Serial No. 400,467

4 Claims. (Cl. 43—49)

This invention relates to improvements in fishing bobs, and particular to means associated with a bob for dangling bait more effectively to lure fish.

Sometimes bait fails to attract fish adequately because the bait does not move in a realistic fashion. For example, a minnow on a hook may sooner or later become enervated, and may remain motionless. Various movable bait devices have been proposed but it remains to give an appearance of liveliness to inert or even inanimate bait on a hook, and yet to actuate the bait under control of the fisherman. A minnow, for example, to best advantage may appear to be inert for a time, and then may be caused to move for a time.

Previously a device has been proposed to move bait by a motor, but a motor imparts motion continuously and the motion imparted is in one direction. Such unidirectional motion of itself is not always desirable; it may at first arouse the curiosity of fish but sooner or later is bound to reveal only an uninviting imitation of live bait. Moreover, such a rotating lure may import an undesirable spinning motion to the fishing bob; that is, bait spun mechanically in only one direction imparts corresponding unidirectional movement to the bob. In consequence, fishing lines that rest on the bob, as fishing lines do, may be twisted or even snarled. More than this, continued rotation of the bob may gradually work the entire bob and bait away from a favorable spot.

In the accompanying drawing is illustrated a preferred embodiment of this invention, with like parts designated by like numerals.

In the drawing:

Figure 1 represents in vertical cross section a fishing bob with associated housing mechanism for oscillating a bait spindle;

Figure 2 shows the effective mechanism in vertical cross section taken on the line 2—2 of Figure 1; and Figure 3 is a detailed showing of a pulley to be contained in the housing, displaying a means of securing actuating lines.

In the following description is set forth as an illustrative embodiment of this invention certain preferred structure. The appended claims distinctly point out novel features of this invention.

In accordance with this invention effective control of the movements of fishing bait is accomplished and various incidental benefits are obtained by causing bait-rotating means to be controlled and operated by movement of the fishing line. Preferably there is housed within the bob a rack and pinion to oscillate a bait-carrying spindle.

The invention will be more clearly understood in its general aspects by reference to the specific form shown in the drawing. It will be understood, however, that the invention may be practiced otherwise than in the specific form illustrated.

In the drawing, a fishing bob 1 contains an arcuate gear rack 2 and cooperating pinion gear 3. The arcuate rack is attached to the flat face of a pulley 4 that is carried on horizontal spindle 5. Spindle 5 is supported by the interior walls of the bob. The pinion gear 3 that enmeshes with circular rack 2 is secured on a vertical spindle 7. This spindle rotates through a guide tube or bearing 6, fastened vertically and extending down through the bottom of the bob. Pinion gear 3 may rest on the top of bearing 6. A lock washer 8 may be fastened about a lower part of spindle 7 to limit upward movement of the spindle and pinion gear. At the bottom of the spindle 7 may be secured fish hook 9. Thus as pinion gear 3 is rotated by circular rack 2, the hook 9 and bait thereon may be moved in a circular direction.

To rotate arcuate rack 2, a flexible pull element 10 may be fastened to the rim of pulley 4. Such a pulling element may extend from pulley 4 through a guide 11 at the top of the bob. At the upper end of line 10 may be conventional swivel 12 to attach fishing line 13. A pull on fishing line 13 through flexible pull line 10 will rotate pulley 4. To resist minor pulls of line 10 and to return pulley 4 to initial position after rotation, there is provided an opposing pull element 14. This may be in various forms but preferably is as shown in the form of an elastic line 14. At one end this elastic counter-pull may be fastened to the pulley and at the other end may be secured to the bob.

A preferred fastening of pull element 10 and of counter-pull element 14 to pulley 4 is illustrated in Figure 3. Cord 10 is shown wound in in the groove partly under pulley 4 and looped over a pin 15 in the groove. This attachment is at such a point that upward pull of line 10 draws the pulley around with it. Elastic counter-pull line 14 may be fastened to the same pin 15. It will be observed that in this form of fastening the upward pull of line 10 is applied with a fulcrum about shaft 5. But in the arrangement shown in Figure 3 this upward pull at one side of pulley 4 is substantially counterbalanced by the pull of elastic line 14 against the upward pull of line 10. This is counter not only in opposing force, but counter also in direction and point of application. Thus the net effect is a substantial balancing of forces about pivot pin 5. This invention is not limited to this particular fastening arrangement, but this arrangement has the advantage of preventing the bob from listing consistently to one side.

If the bob itself is cut in two vertically, as illustrated in Figure 1 it will expose a hollow portion to house the gear arrangement.

A preferred form is illustrated in Fig. 2. In this form a portion of the bob is drilled out to receive pulley 4. The pulley-supporting shaft 5 may be fastened at one end into the body of the bob. The free end of shaft 5 may project into a suitable recess in a plug 16 that is made to fit into the space in front of pulley 4. Plug 16 is hollowed to provide space for gear 3.

With a bob of this sort much of the value of this invention will become apparent in manufacturing. Considerable utility in manufacturing will depend on the facility and rapidity with which the parts may be assembled. A point of merit further resides in the ability to replace parts. The drawings illustrate not only the operating mechanism, but illustrate also the simplicity of assembly and of parts. Thus arcuate rack 2 is secured in very simple manner to a flat face of pulley 4. The fastening of pull line 10 is simple and rapid, and likewise the fastening of the counter-pull elastic line 14. The guide shaft 6 for pinion gear 3 and bait spindle 7 involves simple insertion of the gear and guide, into the bottom of the bob. Where the bob is split vertically the gear and guide assembly as a whole may be inserted into proper position.

In operation, as will be apparent, any substantial pull upwardly on line 10 under control of the fisherman through line 13 will impart a pronounced rotation to pulley 4 and to arcuate rack 2. This will rotate hook 9 about a vertical axis and moreover will rotate the hook, at a marked rate because of the ratio of radius of the arcuate rack to the pinion gear 3. This ratio can be controlled by the manufacturer or even by the fisherman in view of the possibility of placing the rack 3 at different radial distances on pulley 4.

It will be observed further that if counter-pull element 14 is an elastic cord as is illustrated there is some tendency to resist minor twitches of pull cord 10. But elastic cord 14 absorbs any material pull of part 10 and thus is able to return pulley 4. This results in oscillation of bait hook 9. Oscillation tends to prevent migration of the bob as a whole and also tends to present a discontinuous movement of the bait and more attractively to simulate live bait than would merely continuous spinning.

While in accordance with the patent statutes this invention has been illustrated in its breadth and principles by reference to examples that are preferred at present, it will now be apparent to those skilled in the art that other modifications and specific applications of this invention may be made within the scope of the appended claims.

What I claim is:

1. A fishing bob having means to oscillate bait attached thereto comprising an arcuate rack carried by the bob, a geared spindle engaging the rack, the spindle projecting from the bob to carry bait to be oscillated, a flexible pull element attached to rotate the rack in one direction and a second element attached to exert an opposing pull and to return the rack to its initial position.

2. A fishing bob having means to oscillate bait attached thereto, comprising a pulley carried by the bob and bearing an arcuate gear rack, a pinion engaging the gear rack and a bait spindle attached to the pinion to be rotated by the rack, a cord attached to rotate the pulley and extending upwardly from the bob to be pulled by a fishing line, and an elastic cord fastened to the pulley oppositely to the pull cord to exert a counter-pull and to return the pulley to initial position, whereby on upward pulls of the fishing line the bait spindle is oscillated.

3. A fishing bob having housed therein a pulley, an arcuate gear rack secured to a face of the pulley, a vertically disposed pinion gear meshing with the rack, a bait spindle carried by the gear, a guide to maintain vertical alignment of the spindle, a cord secured to the periphery of the pulley and extending from the top of the bob to impart rotation to the pulley, and a counter-pull element of elastic cord having one end secured to the bob and the other end secured to the pulley to oppose the pull of the cord and to return the pulley to initial position.

4. A fishing bob having means to oscillate bait attached thereto, a recess in one of the portions, a pulley mounted on a horizontal axis in the recess, an arcuate gear rack carried in a side face of the pulley, a vertically disposed bait spindle mounted vertically against the inner face of the bob and carrying a gear element to mesh with the circular rack, and a pull cord extending from the top of the bob and fastened to the pulley to rotate the pulley and a pull elastic cord mounted oppositely of the pull cord and extending toward the top of the bob to balance and oppose the pull on the gear rack.

SIDNEY COURVELLE.